United States Patent
Steinlage

(10) Patent No.: US 6,688,405 B2
(45) Date of Patent: Feb. 10, 2004

(54) SIMPLIFIED ADJUSTABLE TINE HARROW ASSEMBLY

(75) Inventor: David Lee Steinlage, Dallas Center, IA (US)

(73) Assignee: Deere & Company, Moline, IL (US)

( * ) Notice: Subject to any disclaimer, the term of this patent is extended or adjusted under 35 U.S.C. 154(b) by 115 days.

(21) Appl. No.: 10/047,715

(22) Filed: Jan. 16, 2002

(65) Prior Publication Data

US 2003/0132013 A1 Jul. 17, 2003

(51) Int. Cl.[7] ............................................. A01B 23/04
(52) U.S. Cl. ...................... 172/705; 172/634; 172/586
(58) Field of Search ................................. 172/705, 706, 172/708, 714, 634, 684, 739, 586

(56) References Cited

U.S. PATENT DOCUMENTS

| | | | | |
|---|---|---|---|---|
| 3,043,377 A | * | 7/1962 | Urben | 172/611 |
| 3,128,834 A | * | 4/1964 | Birkenbach et al. | 172/635 |
| 4,127,178 A | * | 11/1978 | Blair | 172/198 |
| 4,213,506 A | * | 7/1980 | Hake | 172/624 |
| 4,220,211 A | * | 9/1980 | Hake | 172/618 |
| 4,368,783 A | * | 1/1983 | Hake et al. | 172/705 |
| 4,608,933 A | * | 9/1986 | Wyrill, III | 111/152 |
| 5,044,449 A | | 9/1991 | Stirek et al. | 172/634 |
| 5,165,486 A | * | 11/1992 | Davidson | 172/499 |
| 5,427,183 A | * | 6/1995 | Parker | 172/265 |
| 5,443,127 A | * | 8/1995 | Gates | 172/634 |
| 5,540,288 A | * | 7/1996 | Dietrich, Sr. | 172/196 |
| 5,896,820 A | * | 4/1999 | Klinkner et al. | 111/191 |
| 6,564,728 B2 | * | 5/2003 | Ryan et al. | 111/123 |
| 6,612,381 B2 | * | 9/2003 | Powell et al. | 172/586 |

OTHER PUBLICATIONS

Three pages of drawings showing portions of the commercially available John Deere CP Harrow drawbar. No date.
Summers Manufacturing Company Inc., Summers Mounted Harrows, 4 pages, date of publication—1997, published in U.S.A.
DMI Inc., Helping Plants Thrive Through Secondary Tillage, 8 pages, date of publication—unknown, published in U.S.A.

* cited by examiner

Primary Examiner—Robert E. Pezzuto
Assistant Examiner—Kristine Florio

(57) ABSTRACT

A simplified, low component harrow attachment includes several clevis-like mounting castings pivotally connected between two identical flat side sheets. A link which pivots the ranks in unison is pinned to the legs of the mounting castings between the sheets by free-floating pins captured between the sheets. The castings can pivot to a retracted position and be secured by a pin for increased clearance between the teeth and the ground during transport. The rear mounting casting has a longer clevis structure than the remainder of the castings and serves as a tine depth stop when a stop pin is inserted through apertures in the sheets.

14 Claims, 6 Drawing Sheets

SIMPLIFIED ADJUSTABLE TINE HARROW ASSEMBLY

FIELD OF THE INVENTION

The present invention relates generally to agricultural tillage implements, and more specifically to adjustable harrow assemblies.

BACKGROUND OF THE INVENTION

Toothed harrow attachments are commonly mounted behind tillage implements such as field cultivators to level soil and help break up large clods. Several ranks of teeth are supported from a drawbar arrangement, and for accommodating tooth adjustments of the aggressiveness of the harrow, the ranks often are pivotally connected to bracket members attached to drawbars. Such attachments include a relatively large number of components, including numerous nuts, bolts and washers which mount the ranks and connect angle adjusting links. Properly assembling the components and torquing the nuts for maintaining adjustability while eliminating excess looseness in the assembly is a difficult and time-consuming task. The numerous components require a lengthy assembly process and add significant manufacturing costs. Such harrows can also be difficult for the operator to adjust and maintain.

A further problem with the conventional harrow design is providing adequate ground clearance during transport of the attachment. A limited amount of space for the rank-supporting structures and adjusting links often prevents pivoting of the teeth to a retracted position for increasing the clearance.

On harrow attachments having adjustable down-pressure springs on the drawbars, providing a simple and reliable adjustment bolt lock has been a continuing source of difficulty. Conventional latch mechanisms wear heavily because of relative movement between the adjustment screw and the latch. Heavy vibration common in the assembly can also result in loss of desired down-pressure adjustment.

SUMMARY OF THE INVENTION

It is therefore an object of the present invention to provide an improved harrow attachment for an agricultural implement. It is a further object to provide such an attachment which overcomes most or all of the aforementioned problems.

It is another object of the invention to provide an improved harrow attachment having adjustable teeth. It is yet another object to provide such an attachment which has fewer components and is less costly and time-consuming to assemble and maintain than at least most previously available adjustable harrow attachments.

It is still another object of the invention to provide an improved harrow attachment having adjustable teeth which can be adjusted to obtain various ground profiles and which can be pivoted to a transport position to increase ground clearance.

It is yet another object of the invention to provide an improved harrow attachment having a simple and reliable down pressure adjustment lock.

In accordance with the above objects, an improved harrow attachment includes several clevis-like mounting castings pivotally connected between two identical flat side sheets by a like number of bolt assemblies. A drag link which pivots the ranks in unison is pinned to the legs of the mounting casting between the sheets by free-floating pins captured between the sheets. The bolt and free-floating pin design eliminates numerous components and makes fabrication and maintenance less expensive and time-consuming. The design also allows the castings to pivot farther and the drag link to tuck and be pinned in a transport position for increased clearance between the teeth and the ground.

The rear mounting casting has a longer clevis structure than the remainder of the castings and serves as a tine angle setting or aggressive stop when a stop pin is inserted through apertures in the plates. The ability to adjust tine angle allows different final soil profiles to be obtained. By increasing tine down-pressure and orienting the tines in a generally vertical position, tough large clods can be sized. Decreasing tine down-pressure and decreasing or flattening the tine angle facilitates high residue flow through the harrow without plugging or bunching.

To retain the down-pressure spring adjustment in the desired position, a short section of apertured square tubing or a casting with a round inner surface and rectangular outer surface is placed over the threaded portion of the bolt. An aperture in the bolt is aligned with the apertures in the tubing or casting, and a spring pin is inserted. The tubing or casting, which is sandwiched between the sides of the spring support legs, prevents rotation of the bolt from the adjusted position.

DESCRIPTION OF THE PREFERRED EMBODIMENT

Figure 1:
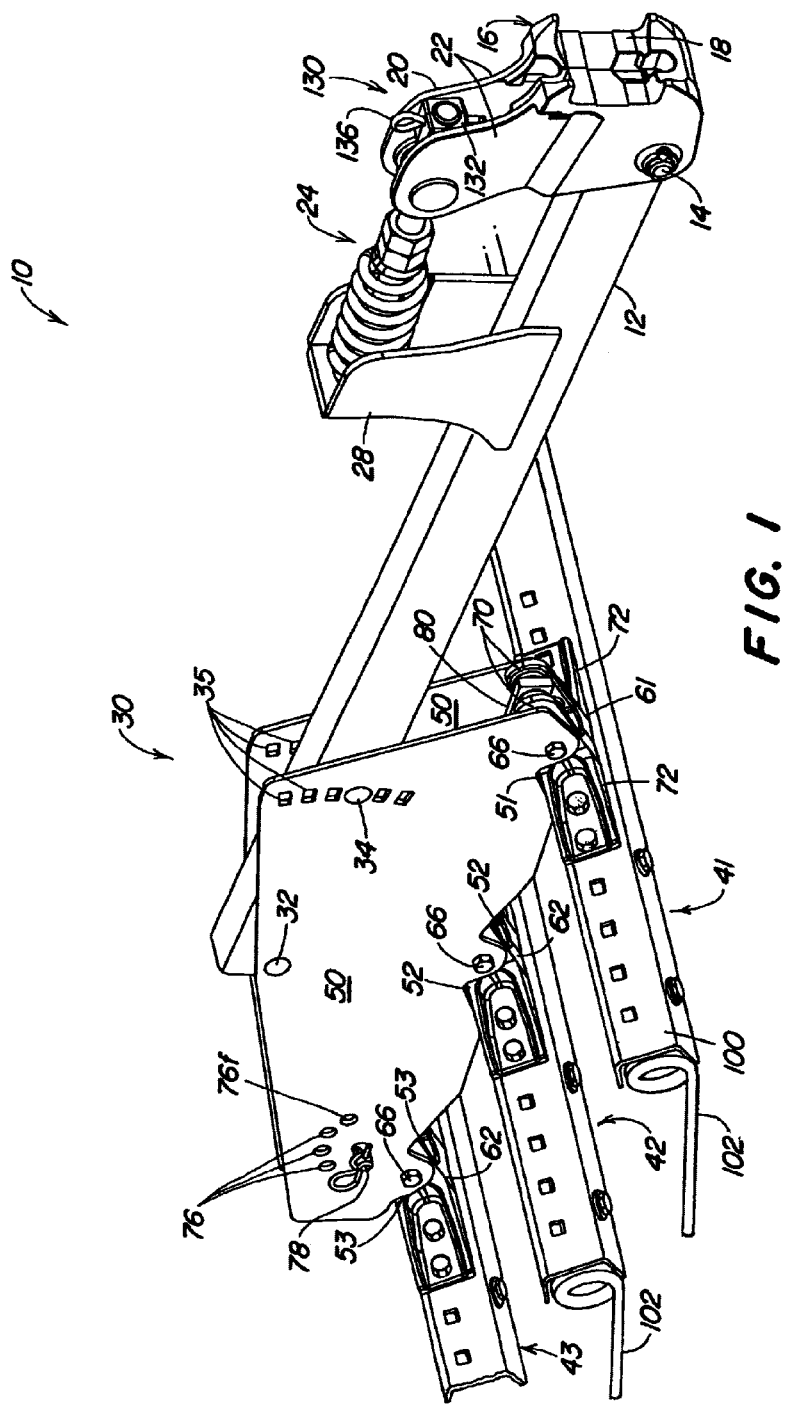
FIG. 1 is a perspective view of a portion of a harrow attachment.

Referring to FIG. 1, therein is shown a portion of a harrow 10 including a drawbar 12 having a forward end pivotally connected by a pin 14 with roll pins at each end to a support bracket 16. The bracket 16 includes a mounting portion 18 adapted for securing against the aft face of an implement frame member (not shown), such as the rear transverse tubular frame member of a field cultivator.

The bracket 16 extends upwardly to a spring support 20 having spaced side walls 22 for receiving the forward portion of a down-pressure spring assembly 24. A spring bracket 28 extends upwardly from the drawbar 12 rearwardly of the pivot pin 14 and supports the aft end of the assembly 24.

An adjustable tine support assembly 30 is pivotally connected to the aft end of the drawbar 12 by a bolt or pivot pin assembly 32 extending though apertures 33, and a bolt or pin 34 located forwardly of the pin 32 and passing through sets of apertures 34*a* or 34*b* in the drawbar 12 and a selected aperture 35 locks the assembly 30 in the desired angular position relative to the drawbar 12. As shown in FIG. 1, three ranks of tines 41, 42 and 43 are carried by the adjustable tine support assembly 30.

Figure 2:
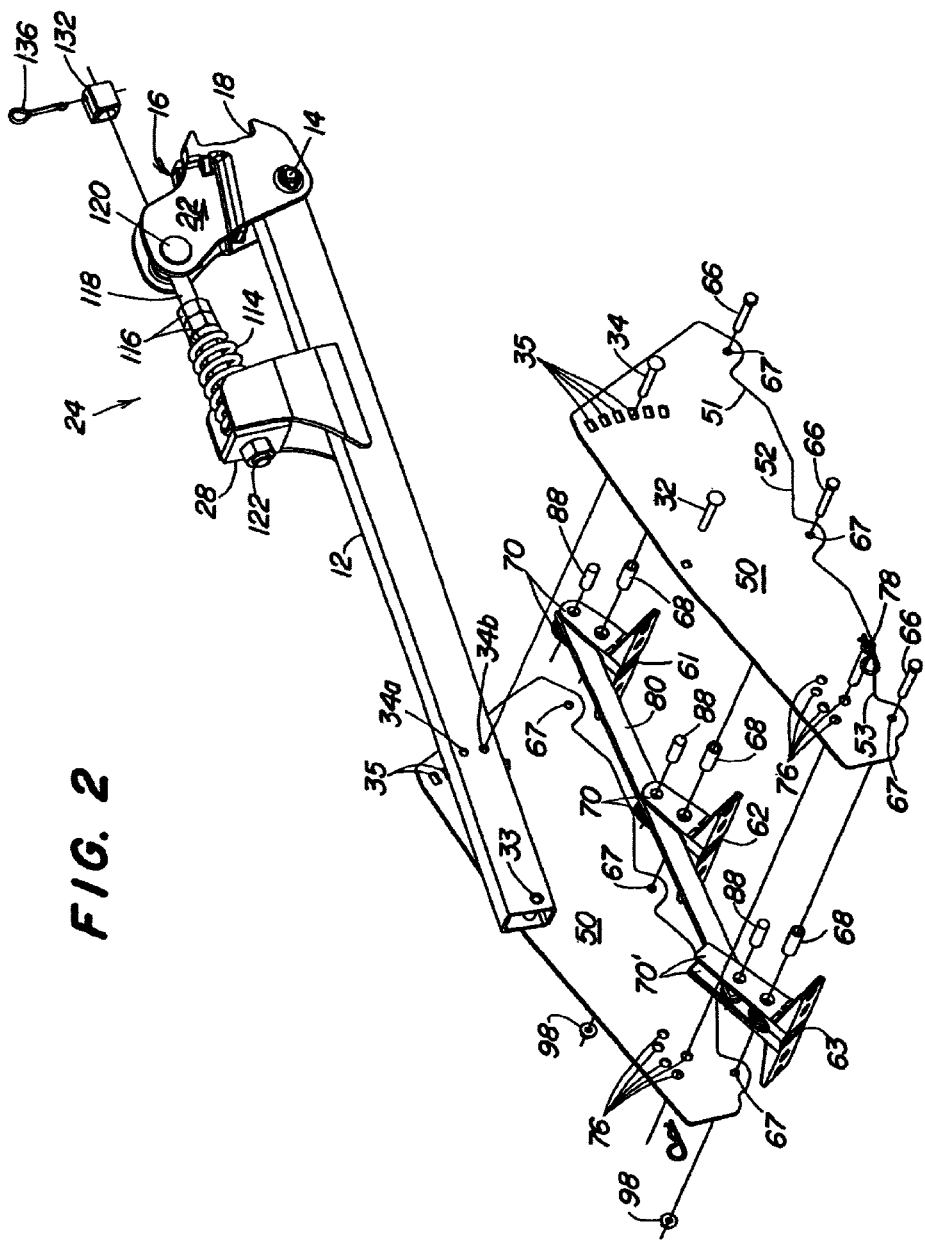
FIG. 2. is an exploded view of a portion of the harrow attachment of FIG. 1.
Figure 3:
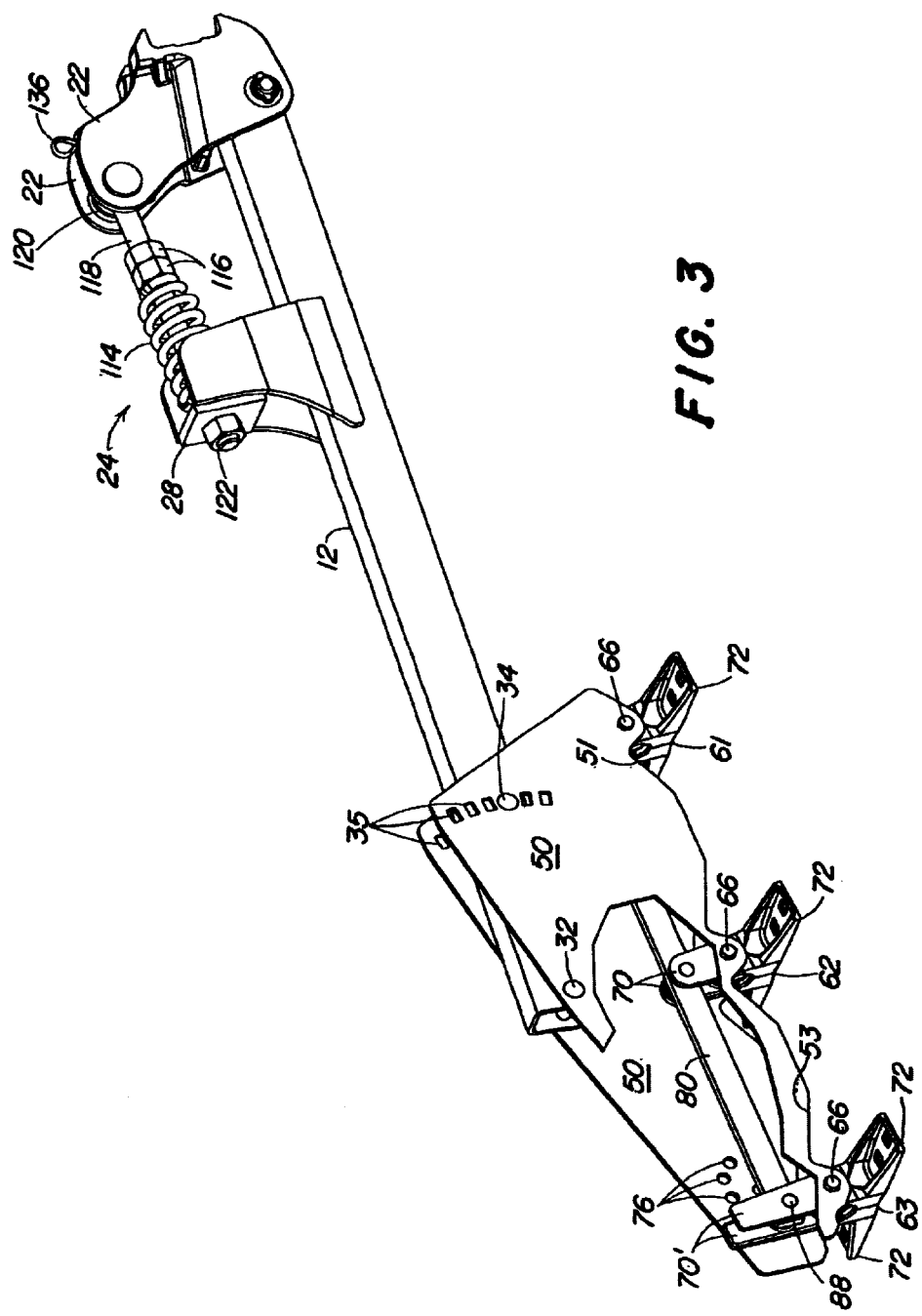
FIG. 3 is a perspective view, partially in section, showing of portion of the harrow attachment with the tine adjustment in the maximum depth working position.

The assembly 20 includes a pair of plates 50, which preferably are planar and identical for ease of manufacture and assembly. An upper edge of each plate is generally straight, and a lower edge includes notch locations 51, 52 and 53 to accommodate pivoting of the ranks of tines 41–43 to a rearward tucked transport position. Tine support brackets 61, 62 and 63 are pivotally mounted between the plates 50 adjacent the lower edge by bolts 66 and bushings 68 (FIG. 2). The bolts 66 extend through apertures 67 near the lower edge of the plates and through the bushings 68. The bolt and bushing combinations not only provide pivot surfaces for the support brackets but also acts to tie the lower portions of the two plates 50, while the top portions of the plates 50 are spaced solidly by the aft end of the drawbar 12 and the bolts 32 and 34. A tight joint is formed with the drawbar 12, and structural strength is increased significantly over previous structures having looser joints so that fewer drawbars for a given width of harrow attachment are required.

Figure 4:
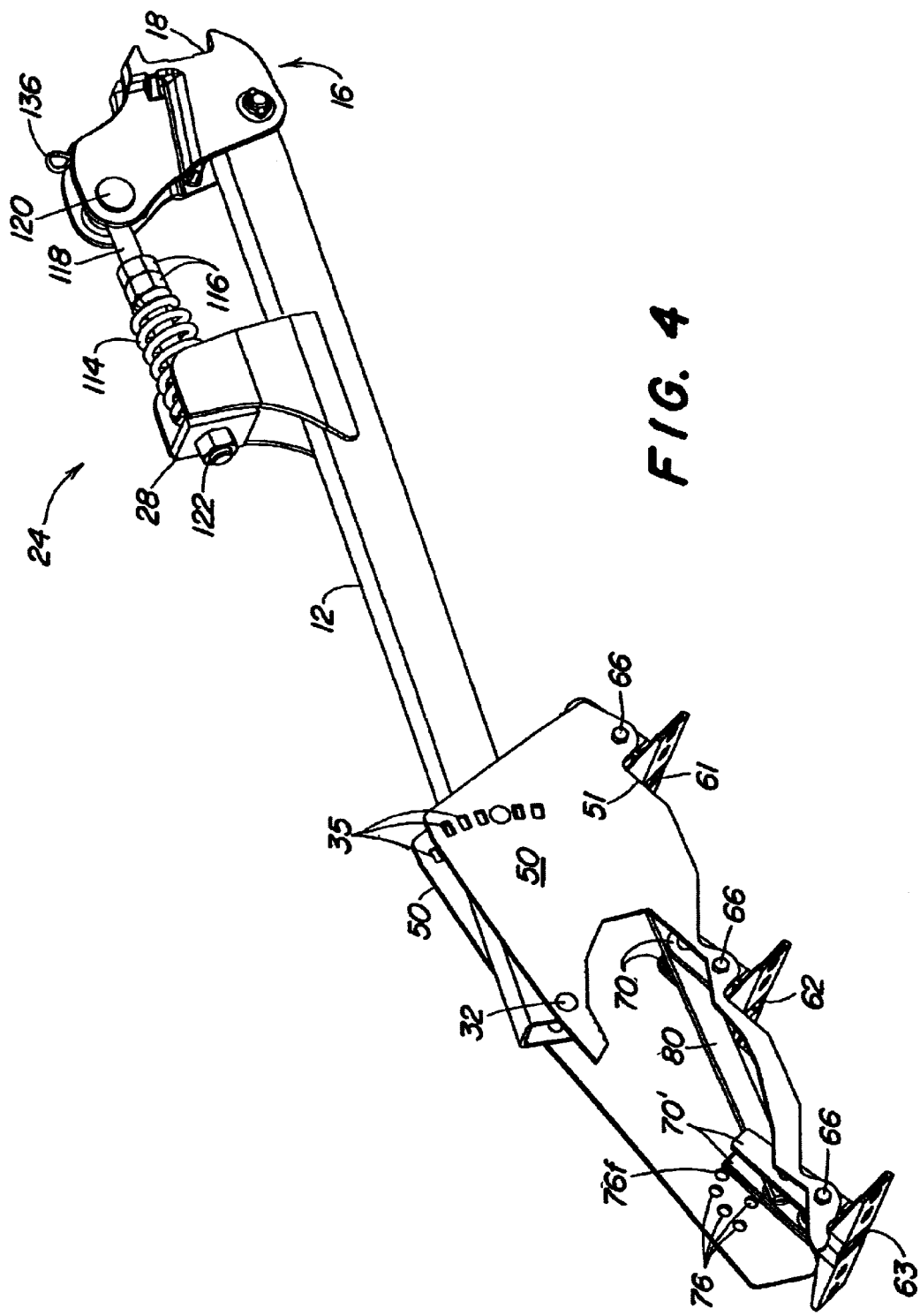
FIG. 4 is a view similar to FIG. 3 but showing the adjustment in the transport position.
Figure 5:
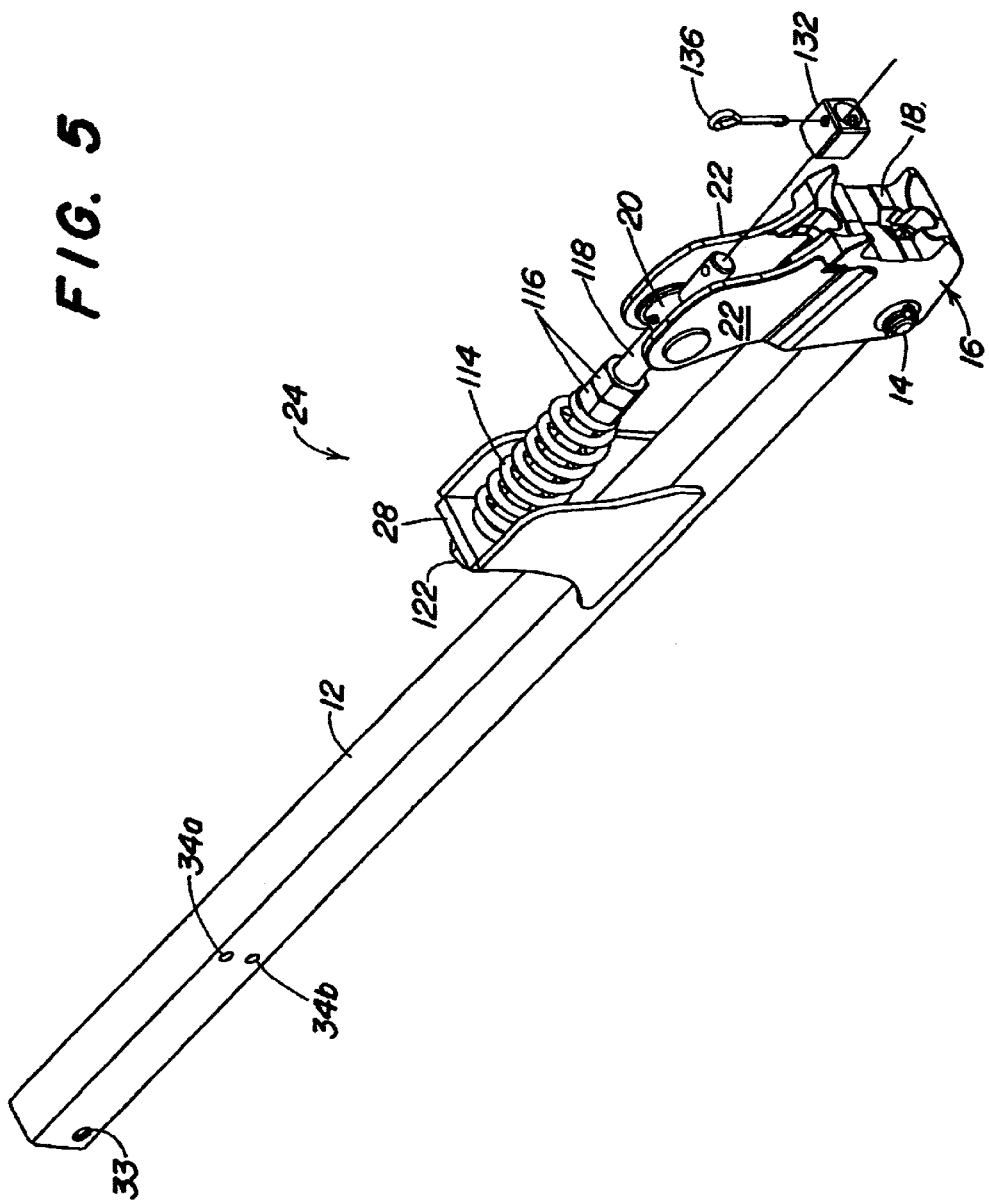
FIG. 5 is a perspective view of the down-pressure adjustment for the harrow attachment.
Figure 6:
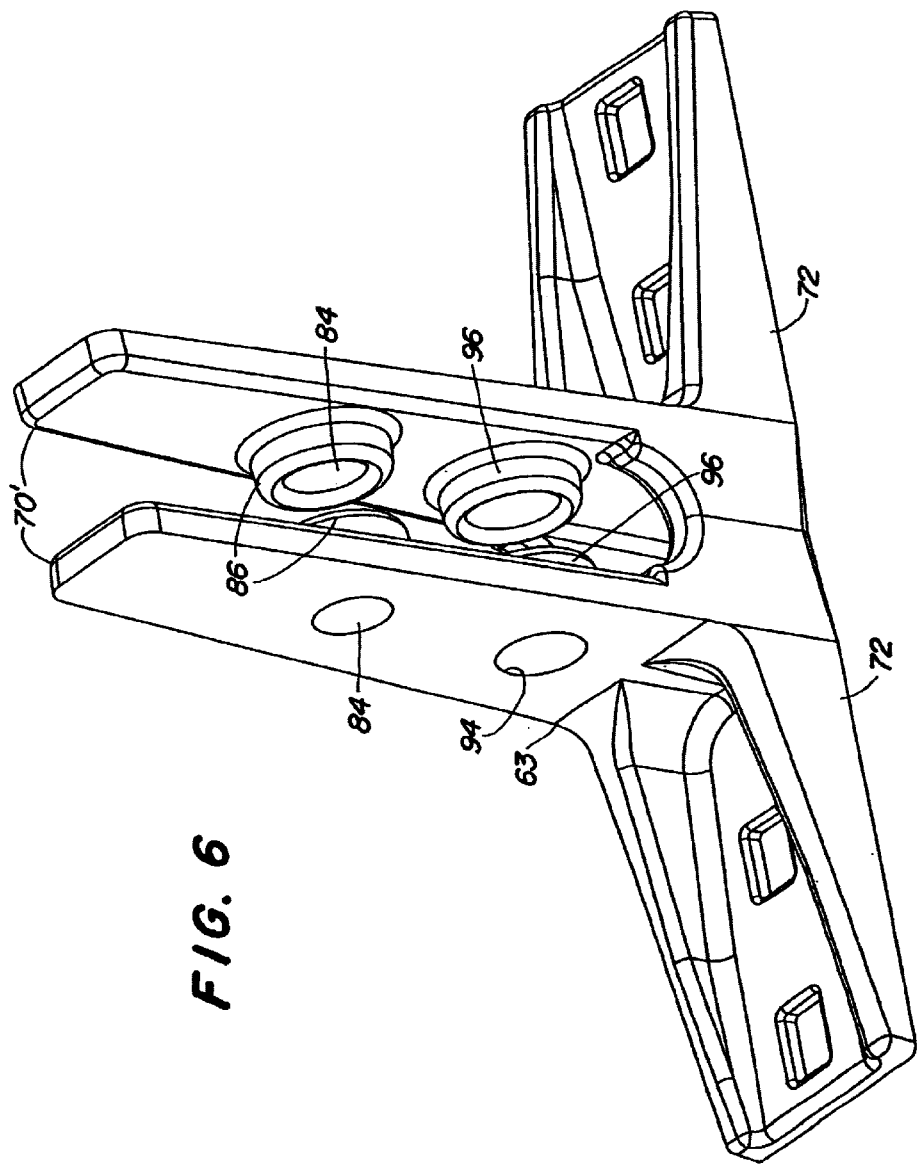
FIG. 6 is an enlarged perspective view of a rank support casting for the harrow attachment.

The brackets 61 and 62 are generally identical and are preferably fabricated as castings having a clevis area or pair of transversely spaced upright legs 70 connected to lower transversely extending apertured attaching flanges 72. The rear support bracket 63 (FIG. 6) is similar in construction to the brackets 61 and 62 but includes longer upright legs 70' which project radially from the pivot area beyond sets of apertures 76 which receive pin 78. The pin 78 acts as a tine angle setting stop by limiting the pivoting of the brackets in the counter-clockwise direction as viewed in FIGS. 1–4. The brackets 61–63 pivot clockwise until the legs hit the tine angle setting pin 78. The tines freely rotate in the counter-clockwise direction to avoid tine damage if the harrow is backed up while the tines are contacting the ground. The pin 78 can also be used to secure the tines in a retracted transport position (FIG. 4) when placed behind the legs 70' in the forwardmost aperture pair location 76f.

A flat connecting link 80 of preselected thickness is pivotally connected between the legs 70 and 70' to constrain the brackets 61–63 for pivoting in unison about the bolts 66 and bushings 68. The legs 70 and 70' include apertures 84 with inwardly projecting bosses 86 which are transversely spaced a distance approximately equal to the preselected thickness of the link 80 to sandwich the link 80 and maintain it in generally an upright plane. A single cylindrical pin 88 of length approximately equal to the spacing of the outer walls of the legs 70 is inserted through each of the aperture pairs 84 and through a corresponding aperture in the link 80. After assembly of the harrow 10, the pins 88 float in the apertures 84 and are held in position by the inner walls of the plates 50 thereby reducing the amount of necessary hardware, assembly time, and maintenance. The compact arrangement of the link 80 within the bosses of the legs of the bracket clevis also provides a clean design and increases the angle through which brackets 61–63 can pivot and move to a transport location for increased ground clearance.

The drawbar 12 and the bolt or pivot pin assembly 32 space the upper end of the plates 50, and the bolts 66 and bushings 68 which pass though apertures 94 and bosses 96 on the bracket castings (FIG. 6) below the apertures 84 space the lower portions of the plates 50. Nuts 98 threaded onto the ends of the bolts 66 secure the plates 50 against the ends of the bushings 68 and maintain the plates in generally a parallel relationship.

Transversely extending tine bars 100 (FIG. 1) are bolted to the flanges 72 and support earthworking tools 102 such as spring tines or the like. The brackets 61–63 pivot in unison in the clockwise direction until the forward edges of the legs 70' of the rear bracket 63 engage the pin 78. By selecting a different set of apertures 76 and changing the location of the pin 78, the angle and thus the aggressiveness and depth of operation of the tools 102 can be changed. If the working depth of the towing implement changes the height of the support bracket 16 relative to the ground changes for any reason, the pin 34 may be relocated relative to the apertures 35 and/or the apertures 34a and 34b to level the harrow 10.

The down pressure spring assembly 24 includes a spring 114 compressed between a pair of nuts 116 threaded onto a bolt or threaded rod 118. A single jam nut or other retaining structure may also be used in place of the two nuts 116. The forward end of the rod 118 is threaded through a turnbuckle 120, and a nut to the rod 118 or other enlarged end 122 at the opposite end of the rod 118 retains the assembly 24 in position and provides a positive down stop limit for the harrow 10. By adjusting the rod 118 relative to the turnbuckle 120, down stop limit can be changed. Because of the extreme vibrations in the harrow 10, a positive anti-rotation assembly 130 is provided for the forward end of the rod 118 to secure the assembly in the position for the desired down-pressure. The assembly 130 includes a short section of square tubing or apertured casting 132 which slides over the forward end of the rod 118. The square tubing or casting 132 and the rod 118 have bores which can be aligned, and a spring pin 136 is inserted through the aligned bores. The cross-sectional width of the square tubing or casting 132 assures that the device will slide between the spaced side walls 22 of the bracket 16 but will not rotate between the walls. Therefore, when the spring pin 136 is inserted, the rod 118 cannot rotate.

Having described the preferred embodiment, it will become apparent that various modifications can be made without departing from the scope of the invention as defined in the accompanying claims.

What is claimed is:

1. A tillage implement adapted for forward movement over the ground:

a drawbar having forward and rearward ends;

first and second spaced upright plates connected to the rearward end;

first and second brackets connected for pivoting about first and second pivots between a lower portion of the upright plates and including spaced legs extending upwardly from the pivots adjacent the upright plates;

a link sandwiched between the legs of the first and second brackets;

floating pins pivotally connecting the link to first and second brackets inwardly of the spaced upright plates for pivoting about axes transverse to the forward direction, wherein the pins are retained relative to the link and the brackets by the upright plates, the link constraining the first and second brackets for pivoting generally in unison; and tool structure connected to the first and second brackets and adjustable with respect to the ground with the pivoting of the brackets.

2. The implement as set forth in claim 1 above including a mounting bracket assembly with side walls connected to the forward end of the drawbar, a spring assembly including a fore-and-aft extending threaded bolt extending between the mounting bracket assembly and the drawbar for adjusting down pressure of the implement and having an aperture, and a bolt rotation restraining device comprising a flat-sided member with a bore extending over the bolt and a pin inserted through the flat-sided member and the aperture in the bolt, the flat-sided member located between the side walls and having a cross-section of sufficient dimension so that the side walls prevent rotation of the tubing and thus the bolt when the pin is inserted.

3. The implement as set forth in claim 1 wherein the brackets are pivotable between downwardly directed positions wherein the tool structure is in a maximum depth of operation position and an offset position wherein the tool structure approaches a fore-and-aft oriented position for maximizing clearance between the ground and the tool structure, and wherein movement of the tool structure to the fore-and-aft oriented position is facilitated by the location of the link within the spaced legs between the spaced upright plates.

4. The implement as set forth in claim 3 wherein the plates are apertured at locations generally along a path of rotation of at least one of the spaced legs, and further including pin structure for insertion through the plates at one of the locations to limit pivoting of the brackets.

5. The implement as set forth in claim 1 wherein the first and second plates are identical and are planar for ease of manufacturing and assembly.

6. The implement as set forth in claim 5 wherein the first and second plates include lower edges with bracket accommodating notches facilitating pivoting of the brackets to a transport position wherein the tool structure is rotated to an offset position above the ground.

7. The implement as set forth in claim 1 wherein the drawbar is connected to and spaces the upper portions of the plates, and further including spacers extending through the first and second pivots and spacing lower portions of the plates.

8. A harrow attachment having a reduced number of components and adapted for forward movement over the ground:
   a drawbar having forward and rearward ends;
   first and second spaced upright plates having upper portions connected to and spaced by the rearward end;
   first and second brackets connected for pivoting about first and second pivots between lower portions of the upright plates, the pivots spacing the lower portions so that the plates are generally parallel, the brackets including spaced legs extending upwardly from the pivots adjacent the upright plates;
   a link sandwiched between the legs of the first and second brackets;
   pins pivotally connecting the link to first and second brackets inwardly of the spaced upright plates for pivoting about axes transverse to the forward direction, the link constraining the first and second brackets for pivoting generally in unison; and
   tine structure connected to the first and second brackets and adjustable with respect to the ground with the pivoting of the brackets.

9. The harrow attachment as set forth in claim 8 wherein the pins are one piece and cylindrical and wherein the pins are retained relative to the link and the brackets by the upright plates to thereby reduce the number of components required to retain the link between the legs.

10. The harrow attachment as set forth in claim 9 wherein the first and second brackets include inwardly directed apertured bosses for receiving the pins and for sandwiching the link between the legs.

11. A harrow attachment having a reduced number of components and adapted for forward movement over the ground:
    a drawbar having forward and rearward ends;
    first and second spaced upright plates having apertured upper portions;
    first bolt structure extending through the apertured upper portions and the rearward end of the drawbar spacing the upper portions and providing a firm connection between the plates and the rearward end;
    at least first and second brackets connected for pivoting about first and second pivots between lower portions of the upright plates, the pivots including bushings spacing the lower portions so that the plates are generally parallel, and second bolt structure firmly sandwiching the bushings between the plates, the brackets including legs extending upwardly from the pivots adjacent the upright plates, wherein the first bolt structure through the plates and the drawbar and the second bolt structure through the bushings provide substantially all structural support for the spaced upright plates;
    a link extending between the legs of the first and second brackets, the link constraining the first and second brackets for pivoting generally in unison; and
    earthworking tool structure connected to the first and second brackets and adjustable with respect to the ground as the brackets are pivoted.

12. The harrow attachment as set forth in claim 11 wherein the legs of the brackets are bifurcated and are located between and generally parallel to the plates and receive the link therebetween.

13. The harrow attachment as set forth in claim 12 including pins pivotally connecting the link to the brackets, and wherein the pins are free-floating and held in position by the plates.

14. The harrow attachment as set forth in claim 11 wherein the first bolt structure includes an implement angle adjusting bolt structure.

* * * * *